United States Patent
Kawakami et al.

[11] Patent Number: 6,165,642
[45] Date of Patent: Dec. 26, 2000

[54] RECHARGEABLE LITHIUM BATTERY HAVING AN IMPROVED CATHODE AND PROCESS FOR THE PRODUCTION THEREOF

[75] Inventors: Soichiro Kawakami; Naoya Kobayashi, both of Nara; Masaya Asao, Tsuzuki-gun, all of Japan

[73] Assignee: Canon Kabushiki Kaisha, Tokyo, Japan

[21] Appl. No.: 08/706,290

[22] Filed: Sep. 4, 1996

[30] Foreign Application Priority Data

Sep. 6, 1995 [JP] Japan .................................... 7-252069

[51] Int. Cl.[7] .............................. H01M 4/36; H01M 4/48; H01M 4/58
[52] U.S. Cl. ..................................... 429/218.1; 429/231.1; 429/231.5; 429/231.95
[58] Field of Search ..................................... 429/218, 209, 429/218.1, 231.95, 231.1, 231.5

[56] References Cited

U.S. PATENT DOCUMENTS

| | | |
|---|---|---|
| 4,299,892 | 11/1981 | Dines et al. . |
| 5,326,545 | 7/1994 | Koksbang et al. ........................ 423/62 |
| 5,589,300 | 12/1996 | Fauteux et al. . |
| 5,599,624 | 2/1997 | Toshiro et al. . |
| 5,599,642 | 2/1997 | Toshiro et al. . |
| 5,601,952 | 2/1997 | Dasgupta et al. ........................ 429/224 |
| 5,762,900 | 6/1998 | Kweon et al. ............................ 423/599 |
| 5,820,790 | 10/1998 | Amine et al. ........................... 252/519.1 |

OTHER PUBLICATIONS

Journal of the Electrochemical Society, vol. 117, No. 2, Feb. 1970, pp. 222–224, A. N. Dey et al., "The Electrochemical Deposition of Propylene Carbonate on Graphite".

*Primary Examiner*—Maria Nuzzolillo
*Assistant Examiner*—Tracy Dove
*Attorney, Agent, or Firm*—Fitzpatrick, Cella, Harper & Scinto

[57] ABSTRACT

A rechargeable lithium battery comprising at least a cathode, a separator, an anode, and an electrolyte or electrolyte solution integrated in a battery housing, is characterized by a cathode constituted of a specific powdery cathode active material having a large specific surface area and a primary particle size of 0.5 $\mu$m or less. The cathode active material is obtained by mixing a salt of a transition metal in and dissolving the salt in an aqueous solution containing at least a water-soluble polymer material to obtain a product, and baking the product to form the powdery cathode active material for use as the cathode active material of the cathode. Alternatively, the cathode active material is obtained by mixing a salt of a transition metal in a monomer capable of forming at least a water-soluble polymer material, polymerizing the monomer to obtain a polymerized product, and baking the polymerized product to form the powdery cathode active material for use as the cathode active material of the cathode. A process for the production of the rechargeable lithium battery is also provided.

18 Claims, 5 Drawing Sheets

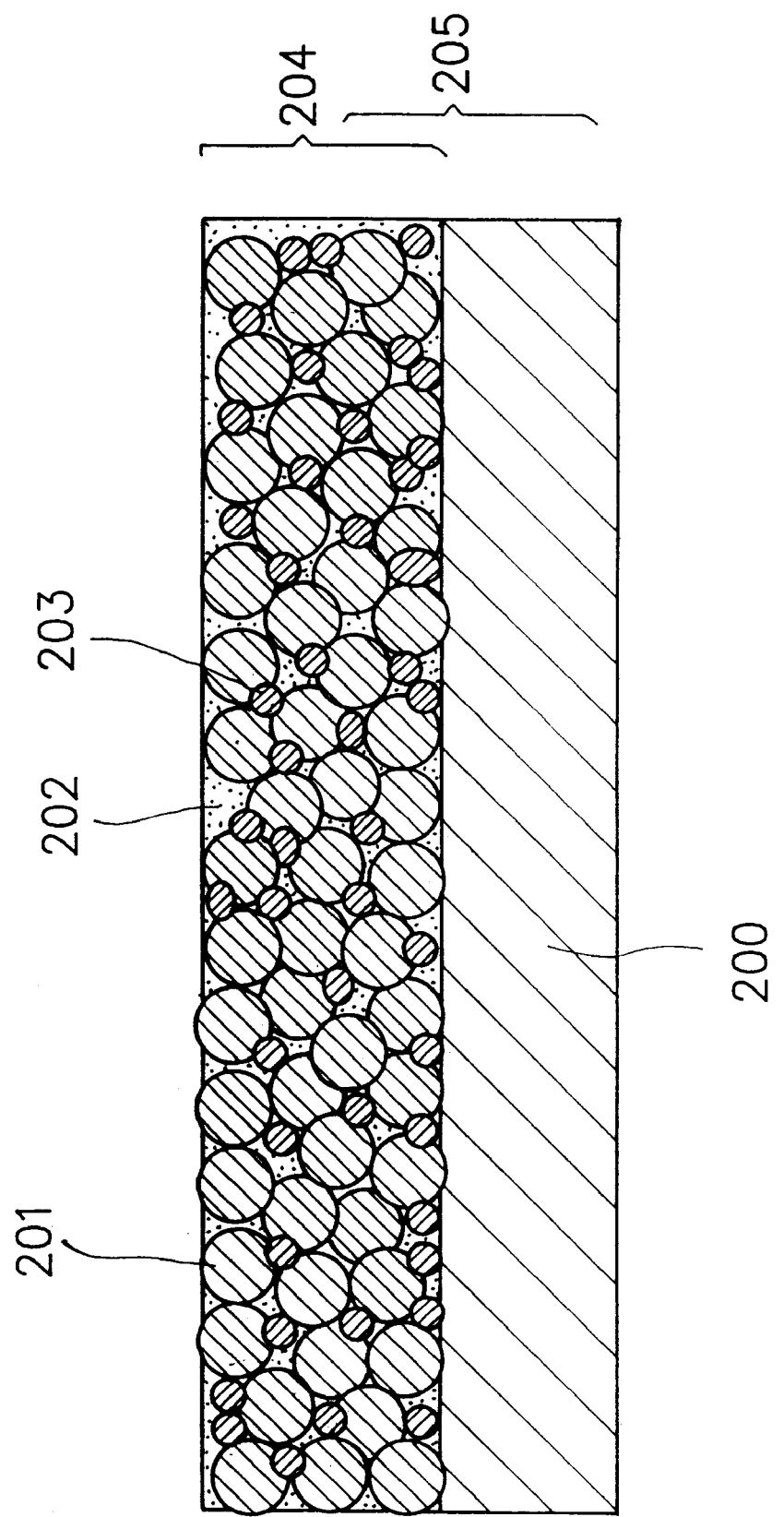

RECHARGEABLE LITHIUM BATTERY HAVING AN IMPROVED CATHODE AND PROCESS FOR THE PRODUCTION THEREOF

BACKGROUND OF THE INVENTION

1. Field of the Invention

The present invention relates to a highly reliable rechargeable lithium battery and a process for the production thereof. More particularly, the present invention relates to a highly reliable rechargeable lithium battery provided with an improved cathode constituted by a specific cathode active material and which is high in charge-and-discharge efficiency and also in discharge capacity, and it also relates to a process for the production of said rechargeable lithium battery.

2. Related Background Art

In recent years, global warming from the so-called greenhouse effect has been predicted due to increased levels of atmospheric $CO_2$. To prevent this warming phenomenon from further developing, there is a tendency to prohibit the construction of new steam-power generation plants which exhaust a large quantity of $CO_2$.

Under these circumstances, proposals have been made to institute load leveling in order to effectively utilize power. Load leveling involves the installation of rechargeable batteries at general locations to store surplus power unused in the night, known as dump power. The power thus stored is available in the day time when the power demand is increased, thereby leveling the load requirements in terms of power generation.

Separately, there is an increased societal demand for developing a high performance rechargeable battery with a high energy density for an electric vehicle which would not exhaust air polluting substances. There is further increased societal demand for developing a miniature, lightweight, high performance rechargeable battery usable as a power source for portable instruments such as small apersonal computers, word processors, video cameras, and pocket telephones.

In order to attain such a miniature and light weight rechargeable battery, the use of lithium-graphite intercalation compound as an anode active material has been proposed (see, *Journal of the Electrochemical Society*, 117, 222 (1970)).

Since then, public attention has focused on a rocking chair type lithium ion battery. Various studies have been made in order to develop such a rocking chair type lithium ion battery. The rocking chair type lithium ion battery is typically configured such that a carbon such as graphite is used as an anode active material and an intercalation compound intercalated with lithium ion is used as a cathode active material, and lithium ion is intercalated at an intercalation of the six-membered network plane provided by carbon atoms and thereby stored in the battery reaction upon operating charging. Presently, there are several known rocking chair type lithium ion batteries having such configuration which are suitable for practical use. In these lithium ion rechargeable batteries, the carbon serving as a host of intercalating the lithium ion as a guest at the intercalation is used as the anode active material to prevent the growth of a lithium dendrite, thereby prolonging the charging and discharging cycle life.

However, based on the configuration of the above lithium ion battery, there cannot be attained a desirable rechargeable lithium battery having an electric capacity and energy density similar to those of a primary battery in which a lithium metal is used as the anode active material.

In order to solve this problem, research and development studies are being made in order to develop a desirable carbon material capable of attaining an improved electric capacity for use as a constituent of the anode in the lithium ion battery.

Separately, in order to realize the production of a rechargeable battery with a high energy density, it is essential to develop not only such an anode material but also an effective cathode material capable of attaining an improved electric capacity. Presently, a lithium-transition metal oxide as an intercalation compound intercalated with lithium ion is principally used as the cathode active material. However, the use of this lithium-transition metal oxide can attain only 40 to 60% of the theoretical discharge capacity. Therefore, in the case of a rechargeable lithium battery including a lithium ion battery in which lithium ion is utilized as a guest in the charging and discharging reactions, there is an increased demand for attaining an improvement in the charging and discharging cycle life and also an improvement in the cathode so that it provides a high electric capacity.

SUMMARY OF THE INVENTION

An object of the present invention is to provide a highly reliable rechargeable lithium battery using an electrochemical intercalation reaction of lithium ion (that is, electrochemical insertion reaction of lithium ion) and an electrochemical deintercalation reaction of lithium ion (that is, electrochemical release reaction of lithium ion) (this rechargeable lithium battery will be hereinafter simply referred to as rechargeable lithium battery), which is provided with an improved cathode constituted by a specific powdery cathode active material having a primary particle size of 0.5 $\mu$m or less and a large specific surface area, and which has a large electric capacity with a high energy density and a high charge-and-discharge efficiency, and is long enough in cycle life (charging and discharging cycle life).

Another object of the present invention is to provide a highly reliable rechargeable lithium battery having a large electric capacity with a high energy density and a high charge-and-discharge efficiency and which is long enough in cycle life, comprising at least a cathode, a separator, an anode, and an electrolyte or electrolyte solution integrated in a battery housing, characterized in that said cathode is constituted by a specific powdery cathode active material having a primary particle size of 0.5 $\mu$m or less and a large specific surface area.

A further object of the present invention is to provide a process for the production of aforesaid rechargeable lithium battery.

Particularly, the present invention provides a process for the production of a highly reliable rechargeable lithium battery having a large electric capacity with a high energy density and a high charge-and-discharge efficiency and which is long enough in cycle life, comprising at least a cathode having a specific cathode active material, a separator, an anode, and an electrolyte or electrolyte solution integrated in a battery housing, characterized in that said process includes a step of preparing said cathode active material constituting said cathode, comprising mixing a salt of a transition metal in an aqueous solution containing at least a water-soluble polymer and dissolving said transition metal salt in said aqueous solution to obtain a product, and baking said product to form a powdery cathode active material.

Further, the present invention provides a process for the production of a highly reliable rechargeable lithium battery having a large electric capacity with a high energy density and a high charge-and-discharge efficiency and which is long enough in cycle life, comprising at least a cathode having a specific cathode active material, a separator, an anode, and an electrolyte or electrolyte solution integrated in a battery housing, characterized in that said process includes a step of preparing said cathode active material constituting said cathode, comprising mixing a salt of a transition metal in a monomer capable of forming at least a water-soluble polymer, polymerizing said monomer to obtain a polymerized product, and baking said polymerized product to form a powdery porous cathode active material.

BRIEF DESCRIPTION OF THE DRAWINGS

FIG. 2 is a schematic cross-sectional view illustrating an example of a cathode in a rechargeable lithium battery in the present invention.

DESCRIPTION OF THE INVENTION AND PREFERRED EMBODIMENTS

Figure 1A:
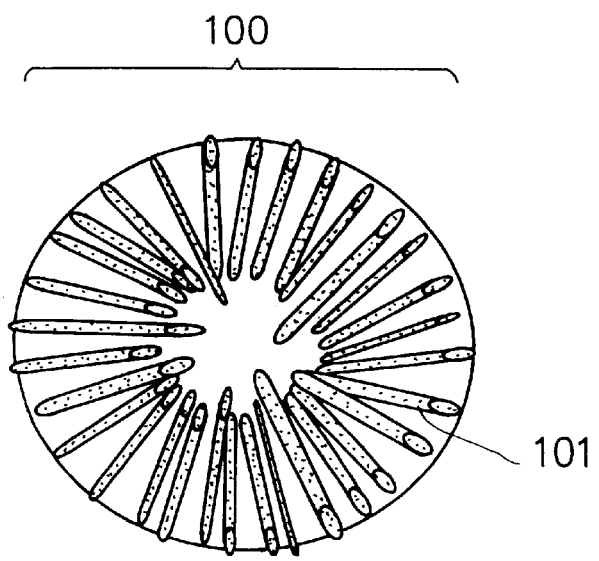
FIGS. 1(A) and 1(B) are schematic views respectively illustrating a cross-sectional structure of a primary particle constituting a cathode active material in a rechargeable lithium battery in the present invention.

In a rechargeable lithium battery using an electrochemical intercalation reaction of lithium ion (that is, electrochemical insertion reaction of lithium ion) and an electrochemical deintercalation reaction of lithium ion (that is, electrochemical release reaction of lithium ion), each of the cathode and anode is constituted by an electrode active material capable of performing electrochemical reversible release or insertion of the lithium ion electrochemically inserted in or released from the cathode or anode.

A principal feature of the present invention lies in an improvement in the electrode active material constituting the cathode (this will be hereinafter referred to as cathode active material). Particularly, the cathode active material in the present invention is comprised of a specific powdery cathode active material having a primary particle size of 0.5 $\mu$m or less and a large specific surface area.

More particularly, an embodiment of a rechargeable lithium battery according to the present invention which comprises at least a cathode, a separator, an anode, and an electrolyte or electrolyte solution integrated in a battery housing, is characterized by a cathode constituted of a specific powdery cathode active material having a primary particle size of 0.5 $\mu$m or less and a large specific surface area, formed by a manner of mixing a salt of a transition metal in an aqueous solution containing at least a water-soluble polymer and dissolving said transition metal salt in said aqueous solution to obtain a product, and baking said product. In this manner, said product is in an aqueous solution or paste-like state in which the transition metal salt is dissolved in the water-soluble polymer such that the transition metal salt is uniformly dispersed in the molecule of the water-soluble polymer and this product is baked. This manner enables the efficient and effective formation of a desirable fine-powdery porous cathode active material composed of a transition metal oxide, transition metal sulfide or the like, which is large enough especially in terms of specific surface area. The fine-powdery porous cathode active material excels in adhesion with an electrode substrate as a cathode collector. Hence, there can be attained the formation of a desirable cathode.

The use of this cathode in a rechargeable lithium battery makes the rechargeable lithium battery have a large electric capacity with a high energy density, a high charge-and-discharge efficiency and a long cycle life.

Another embodiment of a rechargeable lithium battery according to the present invention is characterized in that the cathode is constituted by a specific powdery porous cathode active material formed by of mixing a salt of a transition metal in a monomer capable of forming at least a water-soluble polymer, polymerizing said monomer to obtain a polymerized product, and baking said polymerized product. As well as in the above case, this manner enables the efficient and effective formation of a desirable fine-powdery porous cathode active material composed of a transition metal oxide, transition metal sulfide or the like, which is large enough especially in terms of specific surface area. The fine-powdery porous cathode active material excels in adhesion with an electrode substrate as a cathode collector. Hence, there can be attained the formation of a desirable cathode. The use of this cathode in a rechargeable lithium battery makes the rechargeable lithium battery have a large electric capacity with a high energy density, a high charge-and-discharge efficiency and a long cycle life.

In either of the above two manners, when a lithium salt is mixed together with the transition metal salt, it is possible to readily incorporate a lithium element into the cathode active material. The use of a cathode constituted by such cathode active material containing the lithium element therein from the initial stage wherein neither charging nor discharging is operated prevents the occurrence of a reduction in the current collecting performance due to expansion in terms of the volume upon operating discharging.

Further, in either of the above two manners, when the baking treatment is conducted under flowing inert gas, the polymer is readily carbonized to make the resulting powdery cathode active material a carbonous complexed structure. In this case, the amount of an electrically conductive assistant to be used as a material of forming a cathode can be reduced.

As the water-soluble polymer, when a water-soluble polymer having two or more of at least one kind of polar group selected from the group consisting of hydroxyl group, carboxyl group, and amide group per one molecule thereof is used, the transition metal salt is mixed and dissolved therein in a state wherein the transition metal salt is extremely uniformly dispersed in the water-soluble polymer. This enables the formation of a desirable fine-powdery porous cathode active material having an increased specific surface area after the baking treatment.

Further, as the transition metal salt, when a transition metal carboxylate or a transition metal carbonate is used, no corrosive gas is generated upon the baking treatment. This provides such advantages as will be described in the following. That is, a particular due care is not necessary to be made about gas exhaustion and therefore, a particular gas exhaustion equipment is not required. In this respect, the formation of the cathode can be safely conducted.

Ultrasonic wave irradiation may be conducted upon mixing the transition metal salt in the water-soluble polymer, or upon mixing the transition metal salt in the monomer capable of forming at least a water-soluble polymer, or upon polymerizing the product obtained by mixing the transition metal salt in said monomer. In this case, there can be attained the formation of a polymer containing the transition metal salt in an extremely uniformly dispersed state. This enables the formation of a desirable fine-powdery porous cathode active material having an increased specific surface area after the baking treatment.

In a preferred embodiment, the cathode in the rechargeable lithium battery in the present invention is constituted by a cathode active material with a porous structure with pores distributed therein composed of a transition metal oxide, transition metal sulfide or the like, which has a primary particle size of 0.5 μm or less, preferably which additionally has a size distribution peak in a region of 50 nm or less as for the pores contained therein, most preferably which further has a specific surface area of 100 $m^2/g$ or more.

The thus configured cathode active material of the cathode has an increased area to be contacted with an electrolyte or electrolyte solution and because of this, the mobilization of lithium ion in the battery reaction (that is, the electrochemical reaction) is readily performed and the occurrence of a distortion due to expansion in terms of the volume upon the insertion of lithium ion into the cathode active material is always desirably prevented. As a result, the battery reaction upon operating charging and discharging efficiently proceeds, a large quantity of electric current can be readily flown, and the cathode is always maintained in a stable state without suffering from breakage even upon alternate repetition of charging and discharging over a long period of time. In addition, quick charging is desirably made possible.

Hence, the use of the cathode active material according to the present invention realizes a rechargeable lithium battery having a large electric capacity with a high energy density, a high charge-and-discharge efficiency, and a long cycle life.

Further, in the case where the powdery porous cathode active material is of the foregoing carbon completed structure, the current collecting performance is further improved. This enables the flow of a large quantity of electric current and provides an improvement particularly in the charge-and-discharge efficiency. This situation realizes a rechargeable lithium battery having a large electric capacity with a high energy density, a further improved charge-and-discharge efficiency, and a long cycle life.

In the following, the present invention will be detailed while referring to the drawings.

FIG. 1(A) is a schematic view illustrating a cross-sectional structure of an example of a primary particle constituting a cathode active material used in a rechargeable lithium battery in the present invention.

Figure 1B:
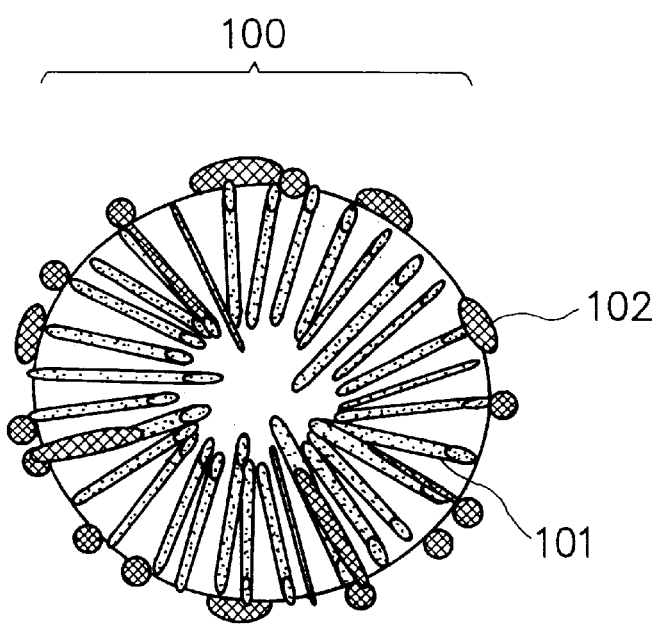

FIG. 1(B) is a schematic view illustrating a cross-sectional structure of another example of a primary particle constituting a cathode active material used in a rechargeable lithium battery in the present invention.

In FIGS. 1(A) and 1(B), reference numeral 100 indicates the entire primary particle, reference numeral 101 a pore, and reference numeral 102 a carbonous material.

The primary particle 100 shown in FIG. 1(A) comprises a structural body having a number of pores 101 on the surface thereof.

The primary particle 100 shown in FIG. 1(B) comprises a structural body having a number of pores 101 on the surface thereof and which is complexed with a plurality of carbonous materials 102.

Particularly, the foregoing powdery cathode active material according to the present invention comprises a primary particle having the configuration shown in FIG. 1(A) or FIG. 1(B).

FIG. 2 is a schematic cross-sectional view illustrating an example of a cathode used in a rechargeable lithium battery in the present invention.

In FIG. 2, reference numeral 200 indicates a cathode collector, reference numeral 201 a powdery cathode active material comprising a secondary particle based on such primary particle as shown in FIG. 1(A) or 1(B), reference numeral 202 a binder, reference numeral 203 an electrically conductive assistant particle, reference numeral 204 a cathode active material layer, and reference numeral 205 the entire cathode.

The cathode 205 shown in FIG. 2 comprises a cathode collector 200 and a cathode active material layer 204 disposed on the cathode collector. The cathode active material layer 204 comprises a number of cathode active material secondary particles 201 and a number of electrically conductive assistant particles distributed therein while being bonded with a binder 202.

Figure 3:
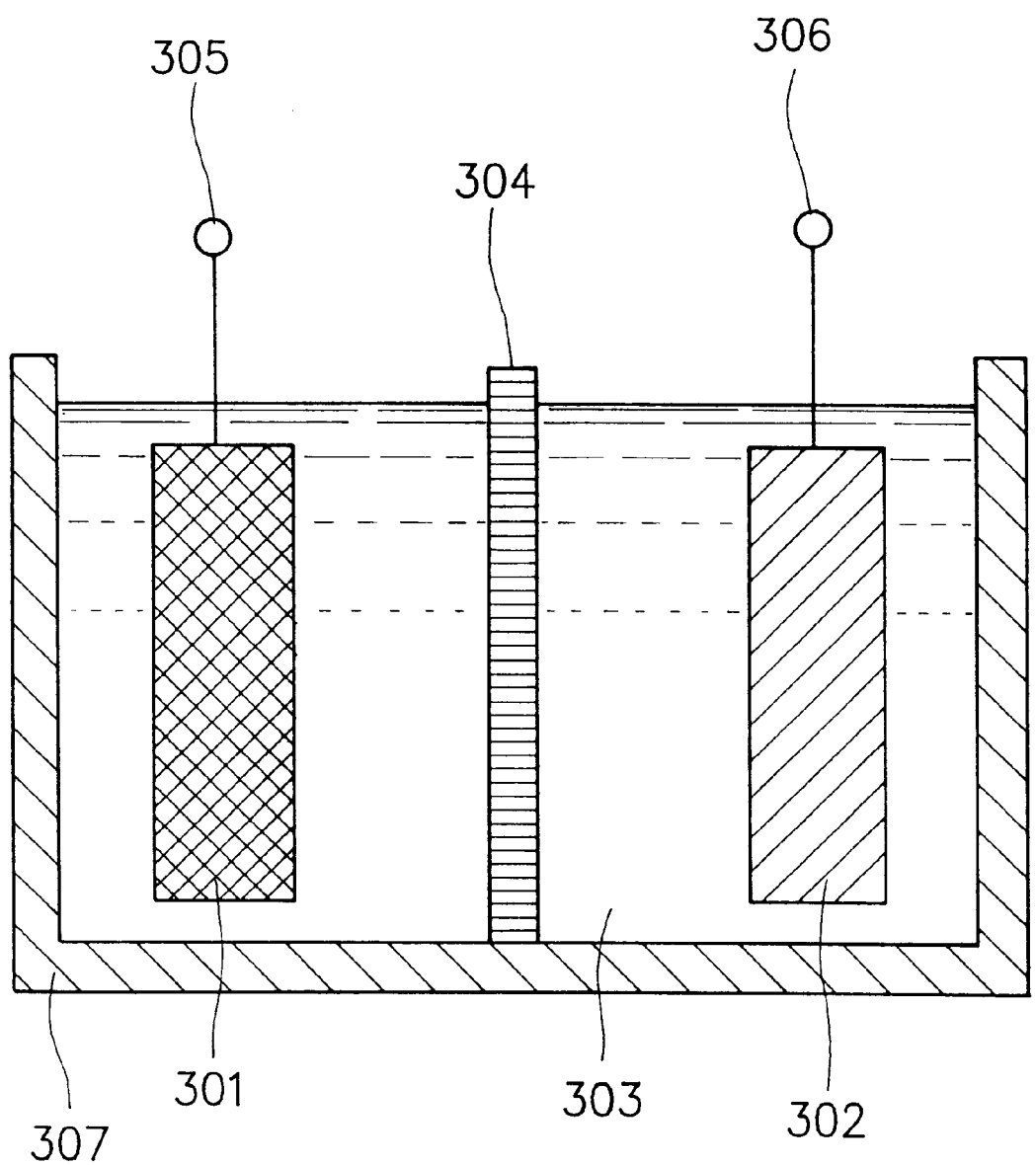
FIG. 3 is a schematic diagram illustrating the constitution of an example of a rechargeable lithium battery according to the present invention.

FIG. 3 is a schematic diagram illustrating the constitution of an example of a rechargeable battery according to the present invention, in which the foregoing cathode according to the present invention, an anode, a separator and an electrolyte (or an electrolyte solution) are combined.

In FIG. 3, reference numeral 301 indicates an anode, reference numeral 302 a cathode having such configuration as shown in FIG. 2, reference numeral 303 an electrolyte (or an electrolyte solution), reference numeral 304 a separator, reference numeral 305 an anode terminal, reference numeral 306 a cathode terminal, and reference numeral 307 a housing. As apparent from FIG. 3, the anode 301 and the cathode 302 are arranged so as to contact the electrolyte 303 and oppose each other. The separator 304 is disposed between the anode 301 and the cathode 302 in order to prevent the occurrence of internal shorts between the two electrodes.

Description will be made of an embodiment of forming a cathode active material according to the present invention.

A typical embodiment of preparing the cathode active material according to the present invention comprises the following two steps (1) and (2).

Step (1): A transition metal salt is mixed in and dissolved in an aqueous solution containing a water-soluble polymer to obtain a product.

Step (2): The resultant product is dried, and then subjected to a baking treatment.

By this, there can be attained a fine-powdery porous cathode active material composed of a transition metal oxide, having a large specific surface area.

When a lithium salt is used together with the transition metal salt in step (1), there can be attained the formation of a fine-powdery porous cathode active material composed of a lithium-transition metal oxide, for example, having a large specific surface area.

The baking treatment in step (2) is conducted preferably at a temperature which is higher than the carbonization or decomposition temperature of the water-soluble high molecular material, specifically, preferably at a temperature of 600° C. or above, more preferably at a temperature of 700° C. or above.

It is possible for step (2) to be conducted in such a manner as to dry the product at a temperature of 200 to 400° C. in an air atmosphere and to subject the dried product to the baking treatment in a stream of inert gas. In this case, there be attained a fine-powdery porous cathode active material complexed with a carbonous material provided as a result of the carbonization of the water-soluble polymer, having a large specific surface area. When a lithium salt is used together with the transition metal salt in step (1) in this case, there can be attained a fine-powdery porous cathode active material composed of a lithium-transition metal oxide, for example, and which is complexed with a carbonous material provided as a result of the carbonization of the water-soluble polymer, having a large specific surface area.

In step (1), ammonium sulfide or sulfide alkali material may be effected after the transition metal salt is mixed in the aqueous solution. In this case, there can be attained a fine-powdery porous cathode active material composed of a transition metal sulfide, having a large specific surface area. In this case, when a lithium salt is used together with the transition metal salt in step (1), there can be attained a fine-powdery porous cathode active material composed of a lithium-transition metal sulfide, having a large specific surface area.

It is possible that in step (1), the aqueous solution containing the water-soluble polymer is replaced by an aqueous solution containing a monomer capable of forming a water-soluble polymer such as polyhydric alcohol, the transition metal salt is mixed in and dissolved in the monomer aqueous solution, followed by polymerization to obtain a polymerized product, and the polymerized product is subjected to the baking treatment in step (2). In this case, there can be also attained a desirable fine-powdery porous cathode active material having a large specific surface area.

The fine-powdery porous cathode active material thus formed is desired to have a primary particle size (as for the constituent primary particles) in a limited range. Particularly, it is desired to have a primary particle size preferably of 0.5 μm or less, more preferably in the range of 5 nm (or 0.005 μm) to 200 nm (or 0.2 μm) in the observation using a scanning electron microscope. As for the particle size, the smaller it is, the greater the specific surface area. Therefore, it is desirable to be as small as possible in order to make the battery reaction smoothly proceed. However, when the primary particle size is excessively small, it is difficult in terms of easy handling.

Further, the fine-powdery porous cathode active material is desired to have a size distribution peak as for the pores distributed therein in a limited region. Particularly, it is desired to have a size distribution peak preferably in a region of 50 nm or less, or more preferably in a region of 0.5 nm to 10 nm, in the analysis by way of gas adsorption method.

Further in addition, the fine-powdery porous cathode active material is desired to have a specific surface area of 100 m$^2$/g or more. To have such a specific surface area provides a large reaction area for lithium ion to move in and out in the battery reaction.

It is possible for the fine-powdery porous cathode material obtained as a result of step (2) to be used after it is pulverized, if necessary.

Description will be made of the water-soluble polymer usable in the present invention.

As previously described, the water-soluble polymer is desired to contain two or more of at least one kind of polar group selected from the group consisting of hydroxyl group, carboxyl group, and amide group per one molecule thereof. Specific examples of such water-soluble high molecular weight materials are polyvinyl alcohol, polyvinyl acetate, polyethylene glycol, polyethylene oxide, poly(2-methyl-2-oxazoline), poly(N-vinylpyrrolidone), poly(N,N-dimethylacrylamide), sodium polystyrenesulfonate, polyamic acid as a polyimide precursor, polyoxytetramethylene, polyacrylic acid, hydroxyl group-containing silicone resin modifications, hydroxypropyl cellulose, methyl cellulose, sodium alginate, and gelatin.

Description will be made of the monomer capable of forming at least the water-soluble high molecular weight material which is usable in the present invention.

The monomer can include polyhydric alcohols. Specific examples are ethylene glycol, 1,2-propylene glycol, 1,3-propylene glycol, 1,2-butylene glycol, 1,3-butylene glycol, 1,4-butylene glycol, 1,6-hexanediol, 1,10-decanediol, 1,4-cyclohexanediol, glycerin, pentaerythritol, sorbitol, and mannitol.

In the foregoing step (1), the polyhydric alcohol is polymerized through a condensation dehydration reaction with, for example, carboxylic acid having two or more carbonyl groups in one molecule to generate an ester. Specific examples of such carboxylic acids are oxalic acid, malonic acid, succinic acid, glutaric acid, adipic acid, sebacic acid, maleic acid, fumaric acid, citric acid, tricarballylic acid, and benzenetricarboxylic acid.

Description will be made of the transition metal salt usable in the preparation of the cathode active material in the present invention.

The transition metal salt can include carbonate, carboxylate, nitrate, sulfate, halide, and hydroxide of an appropriate transition metal element. In order to attain the formation of a fine-powdery porous cathode active material having a large specific surface area, the use of the carbonate or carboxylate is the most appropriate.

Specific examples of such transition metal element are transition metal elements partly having a d-shell or f-shell such as Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Of these, Ti, V, Cr, Mn, Fe, Co, Ni, and Cu, belonging to the first transition series metal elements, are the most appropriate.

Description will be made of the lithium salt usable in the formation of the foregoing cathode active material in the present invention.

The lithium salt can include lithium carbonate, lithium carboxylate, lithium nitrate, lithium sulfate, lithium halide, and lithium hydroxide.

In order to attain the formation of a fine-powdery porous cathode active material having a high specific surface area, lithium carbonate and lithium carboxylate are the most appropriate.

Now, the cathode (shown by reference numeral 303 in FIG. 3) in a rechargeable lithium battery according to the present invention has such configuration as shown in FIG. 2, which typically comprises a cathode collector 200 and a cathode active material layer 204 disposed on the cathode collector, wherein the cathode active material layer 204 comprises a number of cathode active material secondary particles 201 based on such primary particle as shown in FIG. 1(A) or 1(B) and a number of electrically conductive assistant particles distributed therein while being bonded with a binder 202.

In the following, description will be made of an embodiment of forming a cathode having the configuration shown in FIG. 2.

A typical embodiment of forming the cathode according to the present invention comprises the following two steps (i) and (ii).

Step (i): A fine-powdery cathode active material 201 in particle form (prepared in the foregoing manner), a given electrically conductive assistant 202, and a given binder 202 are mixed to obtain a mixture, and the mixture is mixed with a solvent to obtain a paste with a desired viscosity.

Step (ii): The paste obtained in the above is applied on a surface of a given cathode collector 200 by means of a coating process, followed by drying, to thereby form a cathode. In this step, if necessary, it is possible to employ a roller press in order to make the resulting cathode have a desired thickness.

The coating process in step (ii) can include coating by means of a coater and screen-printing.

The electrically conductive assistant 203 usable in step (i) can include carbon blacks such as acetylene black and ketjen black, graphite, and metals which are inactive to the battery reaction.

As for the configuration of the electrically conductive assistant, it may be either in a powdery form or in a fibrous form.

Specific examples of the binder 202 usable in step (i) can include polyolefins such as polyethylene, polypropylene, and the like, and fluororesins such as polyvinylidene fluoride, tetrafluoroethylene polymer, and the like.

The cathode collector 200 serves to effectively supply an electric current so that it can be efficiently consumed for the battery reaction upon operating charging, and to efficiently collect an electric current generated upon operating discharging.

The cathode collector is therefore desired to be constituted by a material which has a high electrical conductivity and is inactive to the battery reaction.

The material by which the cathode collector is constituted can include metals such as Ni, Ti, Cu, Al, Pt, Pd, Au, and Zn, and alloys of two or more of these metals such as stainless steel.

The cathode collector may be shaped in a plate-like form, foil-like form, mesh form, porous form-like sponge, fabric form, punching metal form, or expanded metal form.

In the following, description will be made of the remaining constituents of the rechargeable lithium battery having the configuration shown in FIG. 3 according to the present invention, except for the cathode 302.

ANODE

The anode 301 comprises an anode active material capable of serving as a host material for lithium ion.

Specific examples of such anode active materials are carbonous materials including graphite, lithium metal, lithium alloys, materials containing a metal element capable of forming an alloy with lithium element, porous metallic materials, and transition metal oxides and transition metal sulfides which provide an electromotive force with the cathode active material.

In the case where such an anode active material is in a powdery form, an anode active material layer is formed on an anode collector using a binder or by way of sintering treatment. In the case where the anode active material in a powdery form is low in electrical conductivity, it is necessary to incorporate an electrically conductive assistant into the anode active material upon forming the anode active material layer, as well as in the case of the formation of the cathode active material layer. As the anode collector and the electrically conductive assistant, those materials mentioned above as the cathode collector and those materials mentioned above as the electrically conductive assistant for the cathode active material layer may be optionally used.

SEPARATOR

The separator 304 is disposed between the anode 301 and the cathode 302, and it serves to prevent the anode and the cathode from suffering from internal shorts. In addition, the separator also serves to retain an electrolyte (or an electrolyte solution) for a rechargeable lithium battery.

The separator is required to have a porous structure or a structure having a number of perforations capable of allowing lithium ion to pass therethrough, and it is also required to be insoluble stable with respect to the electrolyte solution.

The separator is desired to be constituted by a nonwoven fabric or a memberane having a micropore structure made of glass, polyolefins such as polypropylene, polyethylene and the like, fluororesin, or polyamide.

Alternatively, the separator may be constituted by a metal oxide film or a resin film combined with a metal oxide respectively having a plurality of perforations. In a preferred embodiment, the separator is constituted by a multi-layered metal oxide film. In this case, the separator effectively prevents a dendrite from passing therethrough and because of this, the occurrence of internal shorts between the anode and the cathode is desirably prevented.

In another preferred embodiment, the separator is constituted by an incombustible fluororesin, glass or metal oxide film. In this case, an improvement can be attained in terms of safety even in the case where such internal shorts unexpectedly occur.

ELECTROLYTE

As for the electrolyte (or the electrolyte solution) 303, there can be used an appropriate electrolyte, a solution of said electrolyte dissolved in a solvent, or a material of said solution having been immobilized using a gelation agent such as polymer. However, an electrolyte solution obtained by dissolving an appropriate electrolyte in a solvent is desired to be used in a way that said electrolyte solution is retained in the porous separator 304 disposed between the anode 301 and the cathode 302.

The higher the electrical conductivity of the electrolyte, the better. Particularly, it is desired to use such an electrolyte that the ionic conductivity at 25° C. is preferably $1\times10^{-3}$ S/cm or more or more preferably, $5\times10^{-3}$ S/cm or more.

The electrolyte usable in the rechargeable lithium battery according to the present invention can include inorganic acids such as $H_2SO_4$, HCl and $HNO_3$, salts of $Li^+$ (lithium ion) with a Lewis acid ion such as $BF_4^-$, $PF_6^-$, $ClO_4^-$, $CF_3SO_3^-$, or $BPh_4^-$ (with Ph being a phenyl group), and mixtures of two or more of said salts.

Other than these supporting electrolytes, salts of the above-described Lewis acid ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitrometane, dimethyl sulfide, dimethoxyethane, methyl formate, 3-methyl-2-oxidazolydinone, 2-methyltetrahydrofuran, 3-propylsydonone, sulfur dioxide, phosphoryl chloride, thionyl chloride, sulfulyl chloride, and mixtures of two or more of these.

As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, whereby moisture and foreign matter are removed.

In order to prevent leakage of the electrolyte solution, it is desired for the electrolyte solution to be gelatinized using an appropriate gelatinizing agent.

The gelatinizing agent usable in this case can include polymers which absorb the solvent of the electrolyte solution to swell. Specific examples of such polymers are polyethylene oxide, polyvinyl alcohol, and polyacrylamide.

SHAPE AND STRUCTURE OF RECHARGEABLE LITHIUM BATTERY

There is no particular limitation for the shape of the rechargeable lithium battery according to the present invention.

The rechargeable lithium battery according to the present invention may be in the form of a flat round shape (or a coin-like shape), a cylindrical shape, a prismatic shape, or a sheet-like shape.

In the case where the rechargeable lithium battery is shaped in a spiral-wound cylindrical form, the anode, separator and cathode are arranged in the named order and they are spriral-wound. Due to this structure there are several advantages in that the battery area can be increased as desired and a high electric current can be flowed upon operating charging and discharging.

In the case where the rechargeable lithium battery is shaped in a prismatic form, there is provided an advantage in that the space of a device for housing the rechargeable lithium battery can be effectively utilized.

As for the structure of the rechargeable lithium battery according to the present invention, it can optionally have a single layer structure or a stacked structure.

Figure 4:
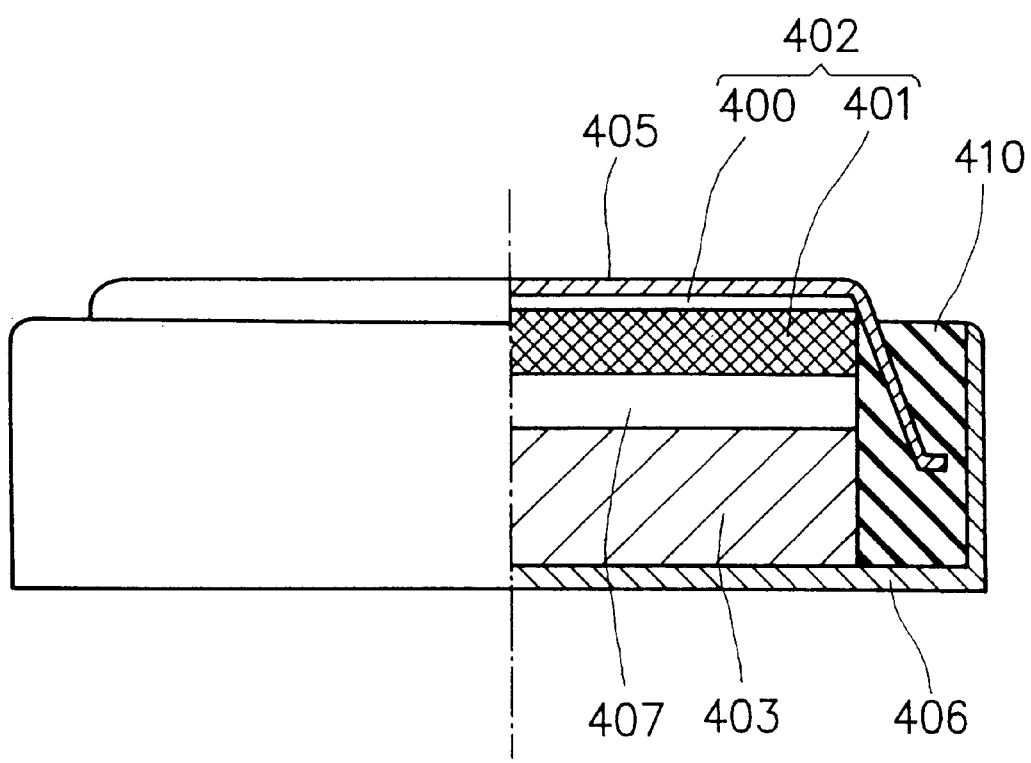
FIG. 4 is a schematic cross-sectional view illustrating an example of a single-layer system flat rechargeable battery according to the present invention.
Figure 5:
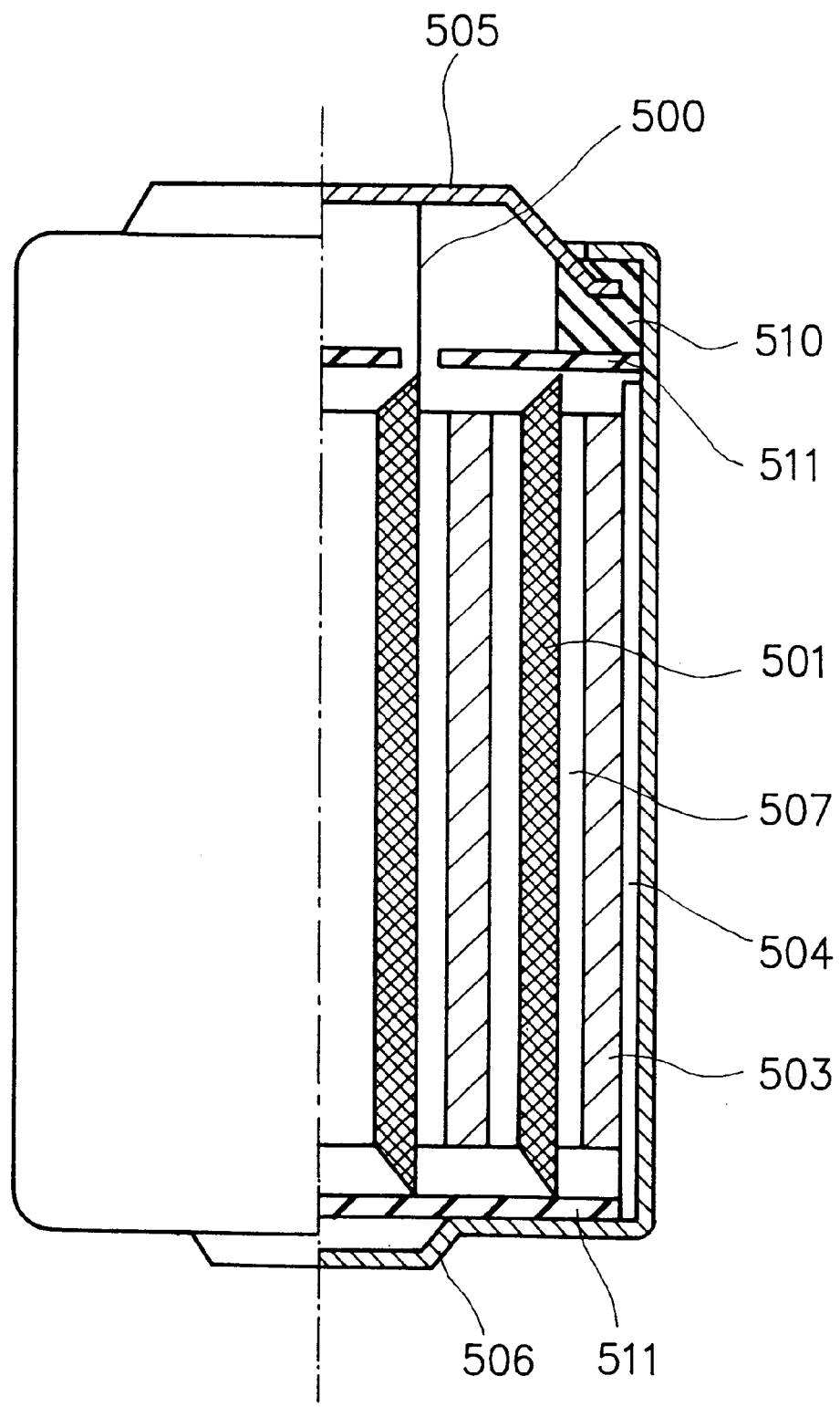
FIG. 5 is a schematic cross-sectional view illustrating an example of a spiral-wound cylindrical rechargeable lithium battery according to the present invention.

FIG. 4 is a schematic cross-sectional view illustrating an example of a single-layer structure type flat rechargeable lithium battery according to the present invention. FIG. 5 is a schematic cross-sectional view illustrating an example of a spiral-wound cylindrical rechargeable lithium battery according to the present invention.

In FIGS. 4 and 5, each of reference numerals 400 and 500 indicates an anode collector, each of reference numerals 401 and 501 an anode active material layer, reference 402 (in FIG. 4) an anode, each of reference numerals 403 and 503 a cathode active material layer (comprising the foregoing powdery porous cathode active material maternal), each of reference numerals 405 and 505 an anode terminal (or an anode cap), each of reference numerals 406 and 506 a cathode can, each of reference numerals 407 and 507 a separator with an electrolyte (or an electrolyte solution) retained therein, and-each of reference numerals 410 and 510 an insulating packing. In the configuration shown in FIGS. 4 and 5, the cathode can (406, 506) also serves as a cathode collector.

In FIG. 5, reference numeral 504 indicates a cathode collector, and reference numeral 511 an insulating plate.

The fabrication of a rechargeable lithium battery of the configuration shown in FIG. 4 or FIG. 5 is conducted, for example, in the following manner. That is, a combination comprising the separator (407, 507) interposed between the anode active material layer (401, 501) and the cathode active material layer (403, 503) is positioned in the cathode can (406, 506). Thereafter, the electrolyte is introduced thereinto. The resultant is assembled with the anode cap (405, 505) and the insulating packing (410, 510), followed by caulking treatment. Thus, there is obtained the rechargeable lithium battery.

The preparation of the constituent materials for the rechargeable lithium battery is desired to be conducted in a dry air atmosphere free of moisture or a dry inert gas atmosphere free of moisture in order to prevent the occurrence of chemical reaction of lithium with water and also in order to prevent the rechargeable lithium battery from deteriorating due to chemical reaction of lithium with water inside the battery.

As the constituent of the insulating packing (410, 510), there can be used polypropylene resin, fluororesin, polyamide resin, polysulfone resin, or various rubbers. The sealing is typically conducted using a gasket such as the insulating packing, as shown in FIGS. 4 and 5. Other than this, it can be conducted by means of glass sealing, adhesive sealing, welding or soldering.

As the constituent of the insulating plate 511 shown in FIG. 5, there can be used organic resins and ceramics.

Any of the cathode can (406, 506) and the anode cap (405, 505) may be constituted by stainless steel, titanium clad steel, copper clad steel, or nickel-plated steel.

In any of the configurations shown in FIGS. 4 and 5, the cathode can (406, 506) is designed to serve also as a battery housing. In the case where a battery housing is independently used, the battery casing can be constituted by a metal such as zinc, an alloy such as stainless steel, a plastic such as polypropylene, or a composite of a metal or glass fiber with plastic.

Although this is not shown in any of FIGS. 4 and 5, it is possible to employ an appropriate safety vent in any of the configurations shown in FIGS. 4 and 5, which serves to ensure the safety when the inside pressure of the rechargeable battery is incidentally increased, by communicating the inside of the rechargeable battery with the outside to thereby reduce the increased inside pressure of the rechargeable battery. The safety vent may be constituted by an elastic body comprising a rubber or a spring or a rupture foil.

In the following, the present invention will be described in more detail with reference to examples, which are only for illustrative purposes and not intended to restrict the scope of the present invention.

EXAMPLE 1 AND COMPARATIVE EXAMPLE 1

Example 1

There was prepared a rechargeable lithium battery of the configuration shown in FIG. 4 in the following manner. Formation of cathode 403:

(1) Preparation of Cathode Active Material:

The cathode active material was prepared in the following manner.

There were mixed cobalt carbonate and lithium citrate in an aqueous solution of 1,2-propylene glycol so that an elementary ratio Co/Li of 1 was provided in the aqueous solution, and an excessive amount of citric acid was added. The resultant was heated at 100° C. to cause a condensation polymerization reaction therein, followed by drying, to obtain a polymerized product.

The polymerized product thus obtained was gradually heated up to 800° C. in an air atmosphere, followed by baking treatment, to obtain a powdery porous cobalt-lithium oxide material having pores distributed therein as the cathode active material.

(2) Formation of Cathode:

The powdery porous cobalt-lithium oxide material obtained in the above was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of a coating process, followed by drying at 150° C. under reduced pressure.

Thus, there was obtained a cathode 403.

Separately, the procedures in the above step (1) for the preparation of the cathode active material were repeated to obtain a powdery porous cobalt-lithium oxide material having pores distributed therein.

As for the resultant powdery porous cobalt-lithium oxide material, examination was conducted with respect to primary particle size, pore distribution state, and specific surface area.

The examination of the primary particle size was conducted using a scanning electron microscope. As a result, it was found to have a primary particle size in the range of 100 nm (or 0.1 $\mu$m) to 200 nm (0.2 $\mu$m).

The examination of the pore distribution state was conducted by way of gas adsorption analysis in accordance with the MP (micropore) method. As a result, it was found to have a size distribution in the range of 0.5 nm to 50 nm as for the pores distributed therein.

The examination of the specific area was conducted in accordance with the BET (Brunauer-Emmett-Teller) method. As a result, it was found to have a specific area of 110 $m^2/g$. Formation of anode 402:

5 wt. % of polyvinylidene fluoride was mixed in a natural graphite fine powder obtained by subjecting natural graphite to heat treatment at 2000° C. in a stream of argon, followed by adding N-methyl-2-pyrrolidone, to obtain a paste. The paste thus obtained was applied on a copper foil as the anode collector 400 by means of a coating process, followed by drying at 150° C. under reduced pressure.

Thus, there was obtained an anode 402.
Preparation of Electrolyte Solution:

There was provided a moisture-free mixed solvent composed of ethylene carbonate (EC) and dimethyl carbonate (DMC) with an equivalent mixing ratio. 1 M (mol/l) of tetrafluoro lithium borate was dissolved in the mixed solvent. Thus, there was obtained an electrolyte solution.
Separator 407:

There was provided a polyethylene member having a number of fine perforations as the separator 407.

Fabrication of rechargeable lithium battery:

The fabrication of a rechargeable lithium battery was conducted in a dry argon atmosphere.

The separator 407 was interposed between the cathode 403 and the anode 402, and the resultant was inserted into a cathode can 406 made of titanium clad stainless steel. Then, the electrolyte solution was injected into the cathode can such that it was retained in the separator. The resultant was sealed using an anode cap 405 made of titanium clad stainless steel and an insulating packing 410 made of polypropylene.

Thus, there was obtained a rechargeable lithium battery.

Comparative Example 1

The procedures of Example 1 were repeated, except that the formation of the cathode 403 was conducted in a different manner as will be described below, to thereby obtain a rechargeable lithium battery.

That is, there was formed a cathode in the following manner.
Preparation of Cathode Active Material:

There were mixed cobalt carbonate and lithium carbonate with a mole ratio of 1:2 to obtain a mixture. The resultant mixture was subjected to heat treatment in an air stream maintained at 800° C. to obtain a lithium-cobalt oxide material as the cathode active material.
Formation of cathode:

The cobalt-lithium oxide material obtained in the above was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of a coating process, followed by drying at 150° C. under reduced pressure.

Thus, there was obtained a cathode 403.

Separately, the above procedures for the preparation of the cathode active material were repeated to obtain a cobalt-lithium oxide material.

As for the resultant cobalt-lithium oxide material, examination was conducted with respect to primary particle size, pore distribution state, and specific area in the same manner as in Example 1.

As a result, the cobalt-lithium oxide material was found to have a primary particle size in the range of 5 $\mu$m to 15 $\mu$m, a size distribution in the range of 10 nm to 100 nm as for the pores distributed therein, and a specific area of 20 $m^2/g$.

Evaluation

As for each of the rechargeable lithium batteries obtained in Example 1 and Comparative Example 1, evaluation was conducted with respect to battery characteristics through the charging and discharging cycle test.

The charging and discharging cycle test was conducted in the following manner. That is, each rechargeable battery is placed in a charging and discharging device HJ-106M (produced by Hokuto Denko Kabushiki Kaisha), wherein charging and discharging are alternately repeated under conditions of 1 C (electric current of 1 time the electric capacity per hour based on the theoretical electric capacity calculated from the cathode active material of each rechargeable battery) for the charging and discharging, and 30 minutes for the rest. As for other conditions, the cut-off voltage upon operating the charging is 4.5 V and the cut-off voltage upon operating the discharging is 2.5 V.

The charging and discharging cycle test was initiated by operating the charging. In the charging and discharging test, as for each rechargeable battery, evaluation was conducted of (a) its charge-and-discharge efficiency (that is, the ratio of the quantity of a discharged electricity to that of a charged electricity) and (b) its discharge capacity after the tenth repetition of the charging and discharging cycle.

The resultant charge-and-discharge efficiency for the rechargeable lithium battery of Example 1 was compared with that for the rechargeable lithium battery of Comparative Example 1, which was set at 1. As a result, the former was found to be superior to the latter by 1.2 times.

Similarly, the resultant discharge capacity for the rechargeable lithium battery of Example 1 was compared with that for the rechargeable lithium battery of Comparative Example 1, which was set at 1. As a result, the former was found to be superior to the latter by 1.3 times.

Based on these results, it is understood that the rechargeable lithium battery obtained in Example 1 has an improved charge-and-discharge efficiency and an improved discharge capacity which are apparently greater than those of the rechargeable lithium battery obtained in Comparative Example 1.

EXAMPLE 2 AND COMPARATIVE EXAMPLE 2

Example 2

The procedures of Example 1 were repeated, except that the formation of the cathode 403 was conducted in a different manner as will be described below, to thereby obtain a rechargeable lithium battery having the configuration shown in FIG. 4.

That is, there was formed a cathode in the following manner.

Preparation of Cathode Active Material:

Nickel acetate and lithium acetate were mixed in and dissolved in an aqueous solution of poly(N-pyrrolidone) so that an elementary ratio Ni/Li of 1 was provided in the aqueous solution. The resultant was gradually heated up to 700° C. in an air atmosphere, followed by baking treatment, to obtain a powdery porous lithium-nickel oxide material having pores distributed therein as the cathode active material.

Formation of cathode:

The powdery porous lithium-nickel oxide material obtained in the above was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of coating a process, followed by drying at 150° C. under reduced pressure.

Thus, there was obtained a cathode 403.

Separately, the above procedures for the preparation of the cathode active material were repeated to obtain a powdery porous lithium-nickel oxide material having pores distributed therein.

As for the resultant powdery porous lithium-nickel oxide material, examination was conducted with respect to primary particle size, pore distribution state, and specific area in the same manner as in Example 1.

As a result, the powdery porous lithium-nickel oxide material was found to have a primary particle size in the range of 100 nm (or 0.1 $\mu$m) to 300 nm, (or 0.3 $\mu$m), a size distribution in the range of 0.5 nm to 50 nm as for the pores distributed therein, and a specific area of 140 m$^2$/g.

Comparative Example 2

The procedures of Example 1 were repeated, except that the formation of the cathode 403 was conducted in a different manner as will be described below, to thereby obtain a rechargeable lithium battery having the configuration shown in FIG. 4.

That is, there was formed a cathode in the following manner.

Preparation of Cathode Active Material:

There were mixed lithium nitrate and nickel carbonate with a mole ratio of 1:1 to obtain a mixture. The resultant mixture was subjected to heat treatment in an air stream maintained at 750° C. to obtain a lithium-nicke oxide material as the cathode active material.

Formation of cathode:

The lithium-nickel oxide material obtained in the above was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of a coating process, followed by drying at 150° C. under reduced pressure.

Thus, there was obtained a cathode 403.

Separately, the above procedures for the preparation of the cathode active material were repeated to obtain a lithium-nickel oxide material.

As for the resultant lithium-nickel oxide material, examination was conducted with respect to primary particle size, pore distribution state, and specific area in the same manner as in Example 1.

As a result, the lithium-nickel oxide material was found to have a primary particle size in the range of 2 $\mu$m to 10 $\mu$m, a size distribution in the range of 10 nm to 100 nm as for the pores distributed therein, and a specific area of 20 m$^2$/g.

Evaluation

As for each of the rechargeable lithium batteries obtained in Example 2 and Comparative Example 2, evaluation was conducted with respect to charge-and-discharge efficiency and discharge capacity in the same manner as in Example 1 and Comparative Example 1.

The resultant charge-and-discharge efficiency for the rechargeable lithium battery of Example 2 was compared with that for the rechargeable lithium battery of Comparative Example 2, which was set at 1. As a result, the former was found to be superior to the latter by 1.2 times.

Similarly, the resultant discharge capacity for the rechargeable lithium battery of Example 2 was compared with that for the rechargeable lithium battery of Comparative Example 2, which was set at 1. As a result, the former was found to be superior to the latter by 1.3 times.

Based on these results, it is understood that the rechargeable lithium battery obtained in Example 2 has an improved charge-and-dicharge efficiency and an improved discharge capacity which are apparently greater than those of the rechargeable lithium battery obtained in Comparative Example 2.

EXAMPLE 3 AND COMPARATIVE EXAMPLE 3

Example 3

There was prepared a rechargeable lithium battery of the configuration shown in FIG. 4 by repeating the procedures of Example 1, except that the formation of each of the cathode and the anode was formed in the following manner.

Formation of Cathode 403:

(1) Preparation of Cathode Active Material:

The cathode active material was prepared in the following manner.

Manganese acetate and lithium citrate were mixed in and dissolved in an aqueous solution of poly(2-methyl-2-oxazoline) so that an elementary ratio Mn/Li of 7/3 was provided in the aqueous solution. The resultant was gradually heated up to 600° C. in an air atmosphere, followed by baking treatment, to obtain a powdery porous lithium-manganese oxide material having pores distributed therein as the cathode active material. (2) Formation of Cathode:

The powdery porous lithium-manganese oxide material obtained in the above was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of a coating process, followed by drying at 150° C. under reduced pressure.

Thus, there was obtained a cathode 403.

Separately, the procedures in the above step (1) for the preparation of the cathode active material were repeated to obtain a powdery porous lithium-manganese oxide material having pores distributed therein.

As for the resultant powdery porous lithium-manganese oxide material, examination was conducted with respect to primary particle size, pore distribution state, and specific area in the same manner as in Example 1.

As a result, the powdery porous lithium-manganese oxide material was found to have a primary particle size in the range of 50 nm (or 0.05 $\mu$m) to 150 nm (or 0.15 $\mu$m), a size distribution in the range of 0.5 nm to 20 nm as for the pores distributed therein, and a specific area of 160 m$^2$/g.

Formation of Anode 402:

There was provided an aluminum foil having a naturally caused oxide film thereon. The oxide film on the aluminum foil was etched with the use of an aqueous solution containing 4 wt. % of sodium hydroxide. The resultant etched surface of the aluminum foil was neutralized and washed with an aqueous solution containing 20 wt. % of nitric acid, followed by drying at 150° C. under reduced pressure.

Thus, there was obtained an anode 402.

Comparative Example 3

The procedures of Example 3 were repeated, except that the formation of the cathode 403 was conducted in a different manner as will be described below, to thereby obtain a rechargeable lithium battery having the configuration shown in FIG. 4.

That is, there was formed a cathode in the following manner.

Preparation of Cathode Active Material:

Manganese nitrate and lithium carbonate were mixed with a mole ratio of 7:3 to obtain a mixture. The resultant mixture was subjected to heat treatment in an air stream maintained at 650° C. to obtain a lithium-manganese oxide material as the cathode active material.

Formation of Cathode:

The lithium-manganese oxide material obtained in the above was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of a coating process, followed by drying at 150° C. under reduced pressure.

Thus, there was obtained a cathode 403.

Separately, the above procedures for the preparation of the cathode active material were repeated to obtain a lithium-manganese oxide material.

As for the resultant lithium-manganese oxide material, examination was conducted with respect to primary particle size, pore distribution state, and specific area in the same manner as in Example 1.

As a result, the lithium-manganese oxide material was found to have a primary particle size in the range of 0.3 $\mu$m to 1 $\mu$m, a size distribution in the range of 10 nm to 100 nm as for the pores distributed therein, and a specific area of 40 m$^2$/g.

Evaluation

As for each of the rechargeable lithium batteries obtained in Example 3 and Comparative Example 3, evaluation was conducted with respect to charge-and-discharge efficiency and discharge capacity in the same manner as in Example 1 and Comparative Example 1.

The resultant charge-and-discharge efficiency for the rechargeable lithium battery of Example 3 was compared with that for the rechargeable lithium battery of Comparative Example 3, which was set at 1. As a result, the former was found to be superior to the latter by 1.1 times.

Similarly, the resultant discharge capacity for the rechargeable lithium battery of Example 3 was compared with that for the rechargeable lithium battery of Comparative Example 3, which was set at 1. As a result, the former was found to be superior to the latter by 1.3 times.

Based on these results, it is understood that the rechargeable lithium battery obtained in Example 3 has an improved charge-and-dicharge efficiency and an improved discharge capacity which are apparently greater than those of the rechargeable lithium battery obtained in Comparative Example 3.

EXAMPLE 4 AND COMPARATIVE EXAMPLE 4

Example 4

There was prepared a rechargeable lithium battery of the configuration shown in FIG. 4 by repeating the procedures of Example 1, except that the formation of each of the cathode and the anode was formed in the following manner.

Formation of Cathode 403:

(1) Preparation of Cathode Active Material:

The cathode active material was prepared in the following manner.

Manganese acetate and lithium citrate were mixed in an aqueous solution of polyvinyl alcohol so as to provide an elementary ratio Mn/Li of 7/3 in the solution, followed by ultrasonic wave irradiation to thereby to dissolve the manganese acetate and lithium citrate in the aqueous solution of polyvinyl alcohol.

The resultant was dried while causing a condensation polymerization reaction therein, to obtain a polymerized product.

The polymerized product thus obtained was gradually heated to 300° C. in an air atmosphere to bake it, followed by further baking treatment at 700° C. in a stream of argon to carbonize the polyvinyl alcohol contained in the polymerized product, to obtain a powdery porous lithium-manganese oxide material with a carbonous complex and having pores distributed therein as the cathode active material.

(2) Formation of Cathode:

The powdery porous lithium-manganese oxide material obtained in the above was mixed with 3 wt. % of acetylene black powder and 5 wt. % of polyvinylidene fluoride powder, followed by adding N-methyl-2-pyrrolidone, to obtain a paste.

The paste thus obtained was applied on an aluminum foil as a cathode collector by means of a coating process, followed by drying at 150° C. under reduced pressure.

Thus, there was obtained a cathode 403.

Separately, the procedures in the above step (1) for the preparation of the cathode active material were repeated to obtain a powdery porous lithium-manganese oxide material with a carbonous material complex and having pores distributed therein.

As for the resultant powdery porous lithium-manganese oxide material, examination was conducted with respect to primary particle size, pore distribution state, and specific area in the same manner as in Example 1.

As a result, the powdery porous lithium-manganese oxide material was found to have a primary particle size in the range of 30 nm (or 0.03 µm) to 100 nm (or 0.1 µm), a size distribution in the range of 0.5 nm to 20 nm as for the pores distributed therein, and a specific area of 180 m$^2$/g.

Formation of Anode 402:

There was provided an aluminum foil having a surface etched by an aqueous solution containing 5 wt. % of potassium hydroxide. The etched surface of the aluminum foil was subjected to anodization treatment using a sulfuric acid aqueous solution of 12 M (mol/l) as an electrolyte solution and a glassy carbon as a counter electrode and by impressing a DC voltage of 30 V. The thus treated surface of the aluminum foil was washed with water, followed by washing with acetone and isopropyl alcohol and drying, then followed by drying at 150° C. under reduced pressure.

Thus, there was obtained an anode 402.

Comparative Example 4

The procedures of Example 4 were repeated, except that the formation of the cathode 403 was conducted in the same manner as in Comparative Example 3, to thereby obtain a rechargeable lithium battery having the configuration shown in FIG. 4.

Evaluation

As for each of the rechargeable lithium batteries obtained in Example 4 and Comparative Example 4, evaluation was conducted with respect to charge-and-discharge efficiency and discharge capacity in the same manner as in Example 1 and Comparative Example 1.

The resultant charge-and-discharge efficiency for the rechargeable lithium battery of Example 4 was compared with that for the rechargeable lithium battery of Comparative Example 4, which was set at 1. As a result, the former was found to be superior to the latter by 1.3 times.

Similarly, the resultant discharge capacity for the rechargeable lithium battery of Example 4 was compared with that for the rechargeable lithium battery of Comparative Example 4, which was set at 1. As a result, the former was found to be superior to the latter by 1.4 times.

Based on these results, it is understood that the rechargeable lithium battery obtained in Example 4 has an improved charge-and-dicharge efficiency and an improved discharge capacity which are apparently greater than those of the rechargeable lithium battery obtained in Comparative Example 4.

Separately, each of the rechargeable lithium batteries obtained in Examples 1 to 4 and in Comparative Examples 1 to 4 was evaluated with respect to charging and discharging cycle life in a manner of making the service capacity after the third repetition of the charging and discharging cycle to be 100% and evaluating the number of the charging and discharging cycles repeated until the service capacity became less than 60% of said service capacity as its charging and discharging cycle life through the foregoing charging and discharging cycle test. As a result, the charging and discharging cycle life of any of the rechargeable lithium batteries obtained in Examples 1 to 4 was found to surpass those of the rechargeable lithium batteries obtained in Comparative Examples 1 to 4.

From the above description, the following facts are understood. That is, the present invention enables the effective formation of a highly reliable cathode having a substantially improved specific area for use in a rechargeable lithium battery in which intercalation reaction and deintercalation reaction for lithium ion are utilized. Particularly, the use of the specific cathode according to the present invention makes it possible to efficiently conduct the electrochemical reaction upon the charging and discharging with a relatively low current density. In fact, as apparent from the results obtained in the above-described examples, it is understood that the present invention enables the effective production of a highly reliable rechargeable lithium battery which is high enough in charge-and-discharge efficiency and also high enough in discharge capacity.

Now, in the above Examples 1 to 4, there were used lithium-cobalt oxide material, lithium nickel oxide material, and lithium-manganese oxide material as the cathode active material. However, these oxide materials are not limitative. Besides these, various other oxide materials such as lithium-vanadium oxide material and the like are also effectively usable as the cathode active material in the present invention. Similarly, only one kind of an electrolyte was used in Examples 1 to 4. However, this is not limitative. Besides this, other electrolytes may be optionally used in the present invention.

What is claimed is:

1. A rechargeable lithium battery comprising at least a cathode, a separator, an anode, and an electrolyte or electrolyte solution assembled in a battery housing, characterized in that said cathode comprises a cathode active material comprising a porous material containing pores distributed therein, said porous material having a primary particle size from 0.005 to 0.3 µm and a pore size distribution peak in a range of 50 nm or less in radius.

2. A rechargeable lithium battery according to claim 1, wherein the pore size distribution peak of the porous material is in a range of 0.5 nm to 10 nm in radius.

3. A rechargeable lithium battery according to claims 1, wherein the porous material as the cathode active material has a specific surface area of 100 m$^2$/g or more.

4. A rechargeable lithium battery according to claim 1, wherein the porous material as the cathode active material comprises an oxide or sulfide of a transition metal.

5. A rechargeable lithium battery according to claim 1, wherein the porous material as the cathode active material contains a lithium element.

6. A rechargeable lithium battery according to claim 1, wherein the porous material as the cathode active material comprises a complex with a carbonous material powder.

7. A rechargeable lithium battery according to claim 1, wherein the porous material as the cathode active material is obtained by baking an aqueous solution or paste of a water-soluble polymer material, containing a salt of a transition metal dissolved therein.

8. A rechargeable lithium battery according to claim 1, wherein the porous material as the cathode active material is obtained by polymerizing a monomer capable of forming at least a water-soluble polymer material containing a salt of a transition metal dissolved therein to obtain a polymerized product, and baking said product.

9. A rechargeable lithium battery according to claim 7, wherein the water-soluble polymer material contains at least one polar group, selected from the group consisting of hydroxyl group, carboxyl group, and amide group, wherein said polymer material contains at least two of said polar groups per one molecule thereof.

10. A rechargeable lithium battery according to claim 8, wherein the water-soluble polymer material contains at least one polar group selected from the group consisting of hydroxyl group, carboxyl group, and amide group, wherein said polymer material contains at least two of said poler groups per one molecule thereof.

11. A rechargeable lithium battery according to claim 7, wherein the transition metal salt is a carboxylate or carbonate of a transition metal.

12. A rechargeable lithium battery according to claim 8, wherein the transition metal salt is a carboxylate or carbonate of a transition metal.

13. A rechargeable lithium battery according to claim 8, wherein the monomer is polyhydric alcohol.

14. A rechargeable lithium battery according to claim 7, wherein the water-soluble polymer material further contains a lithium salt therein.

15. A rechargeable lithium battery according to claim 8, wherein the water soluble polymer material further contains a lithium salt therein.

16. A rechargeable lithium battery according to claim 4, wherein the transition metal is a metal selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, and Au.

17. A rechargeable lithium battery according to claim 4, wherein the transition metal is a metal selected from the group consisting of Ti, V, Cr, Mn, Fe, Co, Ni, and Cu.

18. A rechargeable lithium battery according to claim 4, wherein the transition metal oxide is a compound selected from the group consisting of cobalt oxide, nickel oxide and manganese oxide.

* * * * *

UNITED STATES PATENT AND TRADEMARK OFFICE
CERTIFICATE OF CORRECTION

PATENT NO. : 6,165,642
DATED : December 26, 2000
INVENTOR(S) : Soichiro Kawakami, et al.

It is certified that error appears in the above-identified patent and that said Letters Patent is hereby corrected as shown below:

Title page,
Insert:
-- [*] Notice: This patent issued on a continued prosecution application filed under 37 CFR 1.53(d), and is subject to the twenty year patent term provisions of 35 U.S.C. 154 (a) (2). --.

Column 1,
Line 30, "day time" should read -- daytime --.

Column 4,
Line 18, "of" should be deleted.

Column 8,
Line 33, "element" should read -- elements --.

Column 10,
Line 13, "stable" should read -- and stable --.

Column 13,
Line 37, "110 $m^2$/g. Formation" should read -- 110 $m^2$/g. ¶Formation --.

Column 15,
Line 66, "lithium-nicke" should read -- lithium-nickel --.

Column 16,
Line 62, "material. (2)" should read -- material. ¶(2) --.

Column 18,
Line 16, "dicharge" should read -- discharge --; and
Line 35, "to" should be deleted.

Column 19,
Line 45, "dicharge" should read -- discharge --.

UNITED STATES PATENT AND TRADEMARK OFFICE
CERTIFICATE OF CORRECTION

PATENT NO.    : 6,165,642
DATED         : December 26, 2000
INVENTOR(S)   : Soichiro Kawakami, et al.

It is certified that error appears in the above-identified patent and that said Letters Patent is hereby corrected as shown below:

Column 21,
Line 1, "poler" should read -- polar --; and
Line 15, "water soluble" should read -- water-soluble --.

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*